US009286235B2

(12) United States Patent
Hildesheim et al.

(10) Patent No.: US 9,286,235 B2
(45) Date of Patent: Mar. 15, 2016

(54) VIRTUAL MEMORY ADDRESS RANGE REGISTER

(75) Inventors: Gur Hildesheim, Haifa (IL); Shlomo Raikin, Ofer (IL); Ittai Anati, Haifa (IL); Gideon Gerzon, Zichron Yaakov (IL); Uday Savagaonkar, Portland, OR (US); Francis Mckeen, Portland, OR (US); Carlos Rozas, Portland, OR (US); Michael Goldsmith, Lake Oswego, OR (US); Prashant Dewan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 13/538,900

(22) Filed: Jun. 29, 2012

(65) Prior Publication Data

US 2014/0006746 A1   Jan. 2, 2014

(51) Int. Cl.
G06F 9/26 (2006.01)
G06F 9/34 (2006.01)
G06F 12/10 (2006.01)

(52) U.S. Cl.
CPC .................... *G06F 12/1036* (2013.01)

(58) Field of Classification Search
CPC .................................................. G06F 12/1036
USPC ........................................................ 711/206
See application file for complete search history.

(56) References Cited

U.S. PATENT DOCUMENTS 5,912,453 A    6/1999 Gungl et al.
6,292,874 B1 * 9/2001 Barnett .......................... 711/153
6,456,891 B1 * 9/2002 Kranich et al. .................... 700/2
2003/0163662 A1 * 8/2003 Glew et al. ...................... 711/202
2005/0144422 A1   6/2005 McAlpine et al.
2009/0100054 A1 * 4/2009 Croxford et al. .................. 707/6

FOREIGN PATENT DOCUMENTS

EP    1291776 A2    3/2003
WO    2014/004151 A2    1/2014
WO    2014/004151 A3    3/2014

OTHER PUBLICATIONS

Zhou, Xiangrong; Petrov, P. "Arithmetic-Based Address Translation for Energy-Efficient Virtual Memory Support in Low-Power, Real-Time Embedded Systems." Sep. 4-7, 2005. 18th Symposium on Integrated Circuits and Systems Design. pp. 86-91.*
International Search Report and Written Opinion received for PCT Patent Application No. PCT/US2013/046169, mailed on Nov. 18, 2013, 12 pages.
International Preliminary Report on Patentability received for PCT Patent Application No. PCT/US2013/046169, mailed on Jan. 8, 2015, 9 pages.

* cited by examiner

*Primary Examiner* — Michael Jung
*Assistant Examiner* — Mikka Liu
(74) *Attorney, Agent, or Firm* — Thomas R. Lane

(57) ABSTRACT

Embodiments of apparatuses and methods including virtual address memory range registers are disclosed. In one embodiment, a processor includes a memory interface, address translation hardware, and virtual memory address comparison hardware. The memory interface is to access a system memory using a physical memory address. The address translation hardware is to support translation of a virtual memory address to the physical memory address. The virtual memory address is used by software to access a virtual memory location in the virtual memory address space of the processor. The virtual memory address comparison hardware is to determine whether the virtual memory address is within a virtual memory address range.

17 Claims, 2 Drawing Sheets

VIRTUAL MEMORY ADDRESS RANGE REGISTER

BACKGROUND

1. Field

The present disclosure pertains to the field of information processing, and more particularly, to the field of memory management in information processing systems.

2. Description of Related Art

Some processors used in information processing systems include one or more physical memory address range registers to be used by an operating system or other system software to define one or more physical memory ranges in the physical memory of the information processing system. These physical memory ranges may be used to assign memory types (such as cacheable, non-cacheable, write-through, and write-back) and other attributes to the physical memory locations within the ranges.

BRIEF DESCRIPTION OF THE FIGURES

The present invention is illustrated by way of example and not limitation in the accompanying figures.

DETAILED DESCRIPTION

Embodiments of apparatuses, methods, and systems including virtual address memory range registers are described below. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and the like have not been shown in detail, to avoid unnecessarily obscuring the present invention.

Embodiments of the present invention may provide for user level software (such as an application), instead of or in addition to system software (such as an operating system), to assign attributes to virtual memory regions. Therefore, embodiments of the present invention may be desired to allow user level programs to control access to virtual memory and to control program execution flow based on attributes of the virtual memory region being accessed.

Figure 1:
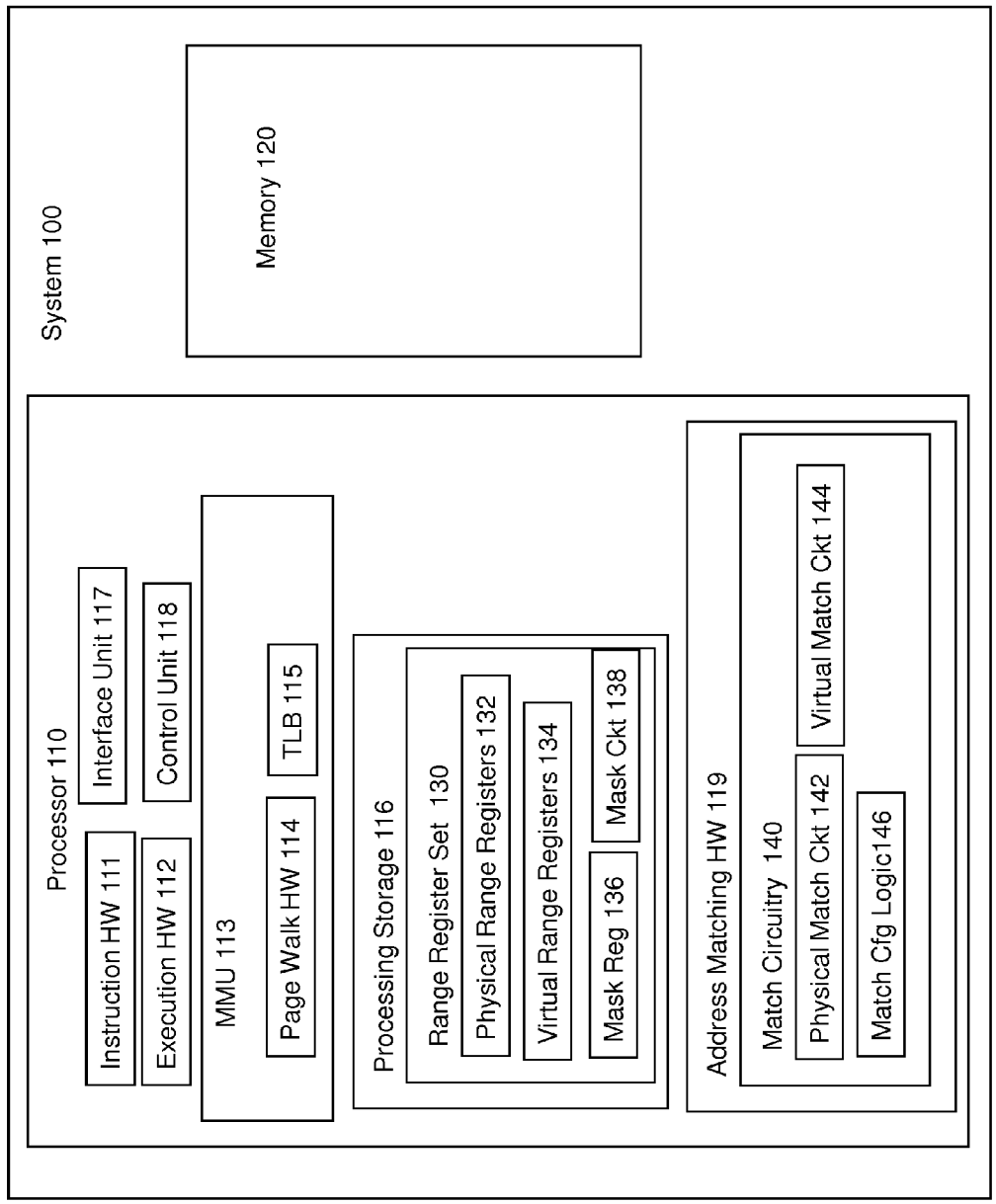
FIG. 1 illustrates an information processing system including a virtual memory address range register according to an embodiment of the present invention.

FIG. 1 illustrates system 100, an information processing system in which an embodiment of the present invention may be present and/or operate. System 100 may represent any type of information processing system, such as a server, a desktop computer, a portable computer, a set-top box, a hand-held device, or an embedded control system. System 100 includes processor 110 and memory 120. Systems embodying the present invention may include number of each of these components and any other components or other elements. Any or all of the components or other elements in any system embodiment may be connected, coupled, or otherwise in communication with each other through any number of buses, point-to-point, or other wired or wireless connections.

Processor 110 may represent any type of processor, including a general purpose microprocessor, such as a processor in the Core® Processor Family, or other processor family from Intel Corporation, or another processor from another company, or any other processor for processing information according to an embodiment of the present invention. Processor 110 may include any number of execution cores and/or support any number of execution threads, and therefore may represent any number of physical or logical processors, and/or may represent a multi-processor component or unit.

Memory 120 may represent any static or dynamic random access memory, semiconductor-based read only or flash memory, magnetic or optical disk memory, any other type of medium accessible by processor 110 and/or other elements of system 100, or any combination of such mediums. Memory 120 may represent a system memory in which data and instructions, including operating system instructions, virtual machine monitor instructions, and application program instructions may be stored.

Processor 110 may include instruction hardware 111, execution hardware 112, memory management unit ("MMU") 113, processing storage 116, interface unit 117, control logic 118, and address matching hardware 119, plus any other units or elements.

Instruction hardware 111 may represent any circuitry, structure, or other hardware, such as an instruction decoder, for fetching, receiving, decoding, and/or scheduling instructions. Any instruction format may be used within the scope of the present invention; for example, an instruction may include an opcode and one or more operands, where the opcode may be decoded into one or more micro-instructions or micro-operations for execution by execution hardware 112.

Execution hardware 112 may include any circuitry, structure, or other hardware, such as an arithmetic unit, logic unit, floating point unit, shifter, etc., for processing data and executing instructions, micro-instructions, and/or micro-operations.

MMU 113 may include any circuitry, structure, or other hardware for translating addresses referring to locations in memory 120. MMU 113 may perform address translations, for example, the translation of a virtual, logical, or linear address to a physical address, according to any known memory management technique, as part of a memory management technique to provide processor 110 with a virtual address space that is larger than the size of memory 120. To perform address translations, MMU 113 may refer to one or more data structures stored in processor 110, memory 120, or any other storage location in system 100 not shown in FIG. 1, and/or any combination of these components and locations. The data structures may include page directories and page tables according to the architecture of the Core® Processor Family, and may include access permissions (e.g., read, write, and execute) that may be used to restrict access to memory based on the type of access. In other embodiments, other address translation techniques may be used.

In one embodiment, MMU 113 receives a linear or virtual memory address provided by an instruction to be executed and/or of data to be fetched by processor 110. MMU 113 uses portions of the virtual memory address as indices into hierarchical tables, including page tables. The page tables contain entries, each including a field for a base address of a page in memory 120. Any page size (e.g., 4 kilobytes) may be used within the scope of the present invention. Therefore, the virtual memory address used by a program to access memory 120 may be translated to a physical memory address used by processor 110 to access memory 120. Address translation may involve addition complexities, such as would be the case for the translation of a virtual memory address used by guest software within a virtual machine to a physical memory address used by host software such as a virtual machine monitor to access memory 120. Any level or number of levels of translation may be required; for example, in a virtualization architecture, a guest virtual memory address may be translated to a guest physical memory address which may be translated to a host physical memory address.

MMU 113 may include page walk hardware 114 for traversing the hierarchy of the paging data structure from a virtual memory address to a physical memory address, and translation lookaside buffer 115 for storing address translations and provide for the paging data structure to be bypassed.

Processing storage 116 may represent any type of storage usable for any purpose within processor 110, for example, it may include any number of data registers, instruction registers, status registers, other programmable or hard-coded registers or register files, or any other storage structures. Processing storage 116 may include programmable range register set 130, which may include one or more physical memory address range registers 132 and one or more virtual memory address range registers 134. Physical memory address range registers 132 and virtual memory address range registers 134 may be of any size and may be implemented according to any known approach to implementing physical memory address range registers (e.g., fixed range, variable range, etc.), with the exceptions to the implementation of the virtual memory address range registers as described in this specification. In one embodiment, a virtual memory address range register 134 may be used to store a base address of a virtual memory address range. One or more mask registers 136 and mask circuitry 138 may be provided and configured such mask circuitry 138 performs a logical 'AND' operation on each bit of the base address stored in virtual memory address range register 134 and the corresponding bit of a mask value stored in mask register 136. Therefore, one virtual memory address range register 134 and its corresponding mask register 136 and mask circuitry 138 may be used to define a virtual memory address range.

Interface unit 117 may represent any circuitry, structure, or other hardware, such as a bus unit or any other unit, port, or interface, to allow processor 110 to communicate with other components in system 100 through any type of bus, point to point, or other connection, directly or through any other component, such as a memory controller or a bus bridge.

Control logic 118 may represent microcode, programmable logic, hard-coded logic, or any other type of logic to control the operation of the units and other elements of processor 110 and the transfer of data within, into, and out of processor 110. Control logic 118 may cause processor 110 to perform or participate in the performance of method embodiments of the present invention, such as the method embodiments described below, for example, by causing processor 110 to execute instructions received by instruction hardware 111 and micro-instructions or micro-operations derived from instructions received by instruction hardware 111.

Address matching hardware 119 may represent any number of comparators and/or other circuitry to determine whether a first address or portion of a first address matches a second address or portion of a second address. Address matching hardware 119 may include match circuitry 140, which may include one physical memory address match circuit 142 for each physical memory address range register 132 and one virtual memory address match circuit 144 for each virtual memory address range register 134. Each physical memory address match circuit 142 is configured to compare a programmed physical memory address range from the corresponding physical memory address range register 132 to the current physical memory address range from MMU 113.

Each virtual memory address match circuit 142 is configured to compare a programmed virtual memory address range from the corresponding virtual memory address range register 134 to the current virtual memory address range from instruction unit 111 or MMU 113.

For example, the programmed virtual memory address range may be determined by performing a logical 'AND' of a programmed virtual base address and a mask, and the current virtual memory address range may be determined by performing a logical 'AND' of the current virtual memory address and the mask. Then, a match signal may be generated based on a comparison of the programmed virtual memory address range and the current virtual memory address range. The match signal may indicate (e.g., with a logical high value), that the current virtual memory address is within the programmed virtual memory address range. The match value may be temporarily stored in a circuit element such as a latch, and may be used to control execution in any way desired. For example, a virtual address range register may be programmed with a virtual memory address range for which additional security checks are desired, so the match signal may be used to invoke a security checking hardware state machine.

Any number and any combination of physical memory address range registers and virtual memory address range register may be used, and each range register may be used to distinguish the programmed memory range in any way desired, for example, to assign attributes to a memory range or to use the detection of an access to a memory range to affect program flow. In particular, the virtual memory address range registers allows user level programs such as applications to assign attributes and detect accesses to memory regions in a way that is not possible with only physical memory address range registers, because user level programs use linear or virtual memory addresses and not physical memory addresses.

Furthermore, match configuration logic 146 may be including in address matching hardware 119 or elsewhere in processor 110 to provide for any of the physical or virtual memory address range checking mechanisms to be enabled or disabled based on any desired conditions.

Figure 2:
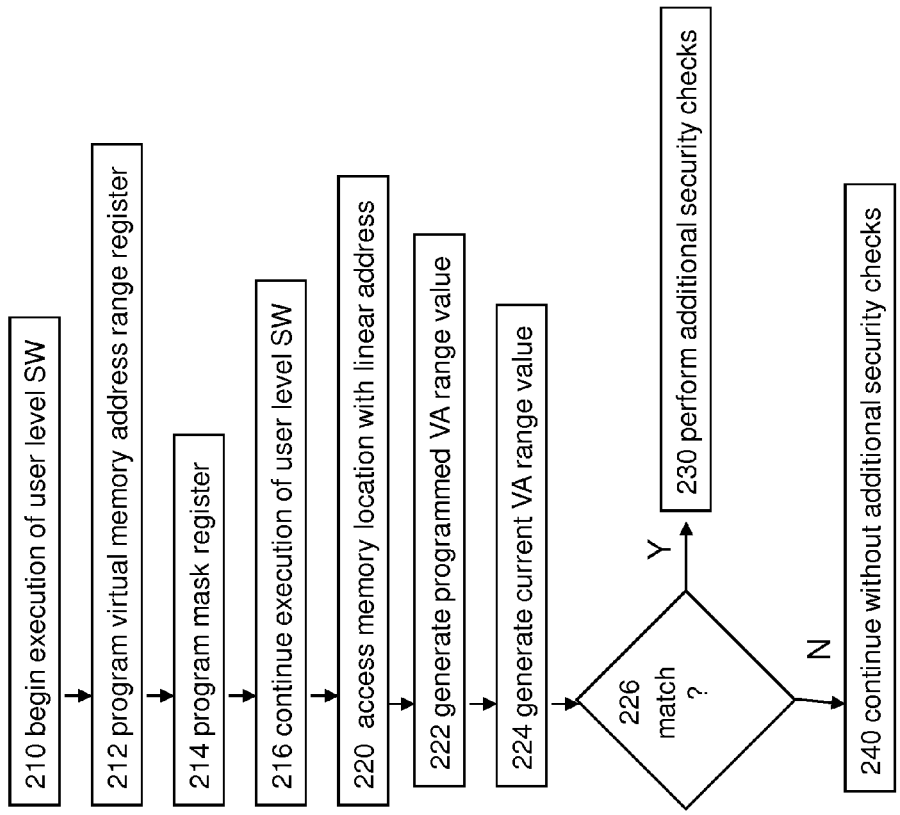
FIG. 2 illustrates a method for using a virtual memory address range register according to an embodiment of the present invention.

FIG. 2 illustrates method 200 for using virtual memory address range registers according to an embodiment of the present invention. The description of FIG. 2 may refer to elements of FIG. 1, but method 200 and other method embodiments of the present invention are not intended to be limited by these references.

In box 210, execution of user level software on processor 110 begins. In box 212, the user level software programs a virtual memory address range register 134 with the base address of a virtual memory address region. In box 214, the user level software programs a mask register 136 with a mask value. In box 216, execution of the user level software continues.

In box 220, user level software attempts to access a memory location using a linear or virtual memory address. In box 222, processor hardware determines the logical AND of the base address and the mask value to generate a programmed virtual address range value. In box 224, processor hardware determines the logical AND of the linear address and the mask value to generate a current virtual address range value. In box 226, processor hardware determines whether the current virtual address range value matches the programmed virtual address range. If so, then method 200 continues in box 230. If not, then method 200 continues in box 240.

In box 230, execution continues based on the detection of an access to the programmed virtual memory address range. Any desired actions, such as additional security checks, may be performed.

In box 240, execution continues based on no access to the programmed virtual memory address range.

Within the scope of the present invention, the method illustrated in FIG. 2 may be performed in a different order, with illustrated boxes omitted, with additional boxes added, or with a combination of reordered, omitted, or additional boxes.

Thus, apparatuses, methods, and systems including virtual address memory range registers are described below have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
   a memory interface to access a system memory using a physical memory address;
   address translation hardware to support translation of a virtual memory address to the physical memory address, the virtual memory address used by software to access a virtual memory location in a virtual memory address space of the processor;
   a virtual memory address range register programmable by user level software to store a virtual memory base address of a virtual memory address range; and
   virtual memory address comparison hardware to determine whether the virtual memory address is within the virtual memory address range.

2. The processor of claim 1, further comprising a physical memory address range register to store a physical memory base address of a physical memory address range.

3. The processor of claim 2, further comprising physical memory address comparison hardware to determine whether the physical memory address is within the physical memory address range.

4. The processor of claim 3, further comprising a mask register to store a mask value.

5. The processor of claim 4, further comprising a first AND circuit to generate a current virtual memory address range value based on the virtual memory address and the mask value.

6. The processor of claim 5, further comprising a second AND circuit to generate a programmed virtual memory address range value based on the virtual memory base address and the mask value.

7. The processor of claim 6, wherein the virtual memory address comparison hardware determines whether the virtual memory address is within the virtual memory address range by comparing the current virtual memory address range value to the programmed virtual memory address range value.

8. The processor of claim 7, further comprising a latch to store a match signal, the match signal indicating that the current virtual memory address range value matches the programmed virtual memory address range value.

9. A method comprising:
   programming, by user level software, a virtual memory address range register with a virtual memory base address of a virtual memory address range; and
   determining whether a virtual memory address is within the virtual memory address range.

10. The method of claim 9, further comprising programming a mask register with a mask value.

11. The method of claim 10, further comprising generating a current virtual memory address range value based on the virtual memory address and the mask value.

12. The method of claim 11, further comprising generating a programmed virtual memory address range value based on the virtual memory base address and the mask value.

13. The method of claim 12, wherein the virtual memory address comparison hardware determines whether the virtual memory address is within the virtual memory address range by comparing the current virtual memory address range value to the programmed virtual memory address range value.

14. The method of claim 13, wherein determining that the virtual memory address is within the virtual memory address range invokes a security checking action.

15. A system comprising:
   a system memory; and
   a processor including
      an interface to access the system memory using a physical memory address;
      address translation hardware to support translation of a virtual memory address to the physical memory address, the virtual memory address used by software to access a virtual memory location in a virtual memory address space of the processor;
      a virtual memory address range register programmable by user level software to store a virtual memory base address of a virtual memory address range; and
      virtual memory address comparison hardware to determine whether the virtual memory address is within the virtual memory address range.

16. The system of claim 15, further comprising a physical memory address range register to store a physical memory base address of a physical memory address range.

17. The system of claim 16, further comprising physical memory address comparison hardware to determine whether the physical memory address is within the physical memory address range.

* * * * *